Patented Apr. 29, 1924.

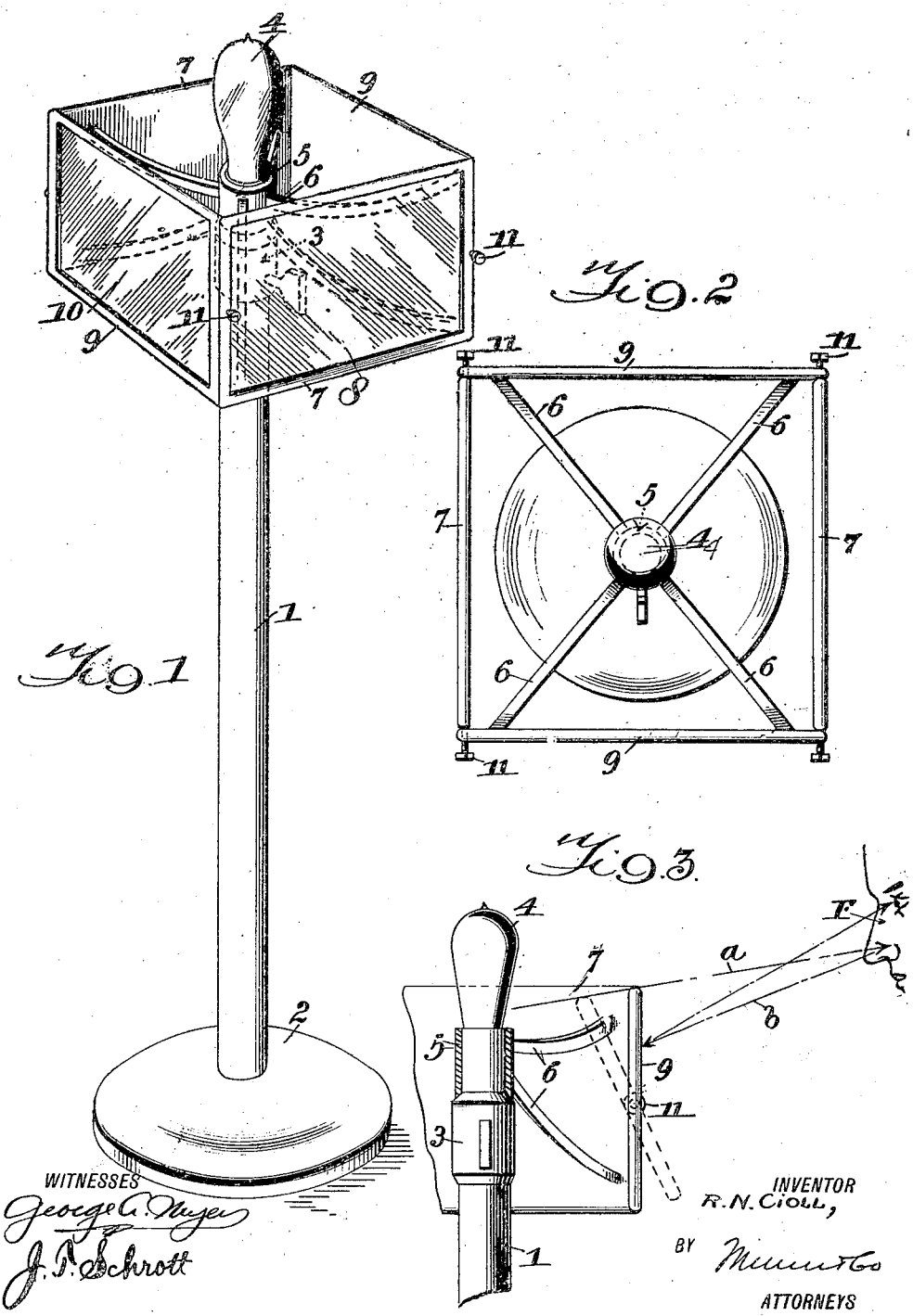

1,492,427

UNITED STATES PATENT OFFICE.

RUBIN N. CIOLL, OF MEMPHIS, TENNESSEE.

LIGHT STAND.

Application filed April 6, 1923. Serial No. 630,339.

*To all whom it may concern:*

Be it known that I, RUBIN N. CIOLL, a citizen of the United States, and a resident of Memphis, in the county of Shelby and State of Tennessee, have invented certain new and useful Improvements in Light Stands, of which the following is a specification.

My invention relates to improvements in light stands and it consists of the constructions, combinations and mode of operation herein described and claimed.

An object of the invention is to provide a stand which is adapted for shaving and other toilet uses.

Another object of the invention is to provide a shaving stand having a light by which the base is illuminated, the light being in such relationship to the mirror that only the illuminated face will be seen and not a confusing reflection of the lamp itself.

Another object of the invention is to provide a stand with four or more mirrors utilizing one source of light, which stand, by being placed in some central position, may be used by more than one person at the same time and in fact by as many persons as there are mirrors surrounding said source of light, thus making for economy in space and light power.

Other objects and advantages will appear in the following specification, reference being had to the accompanying drawing, in which:—

Fig. 1 is a perspective view of the improved light stand,

Fig. 2 is a plan view thereof, and

Fig. 3 is a detail sectional view, parts being in elevation.

In carrying out the invention, provision is made of a standard 1 which is supported by a base 2 at the bottom. A stand of the character disclosed combines more than one object in the one device, in other words, the stand supports not only a lamp, but also several mirrors. At the top the standard 1 has the conventional electric lamp socket 3 into which the lamp 4 is screwed. The collar 5 of the mirror frame is fitted on the socket before the lamp is screwed in place, the lamp therefore (in a measure at least) serving to hold the collar 5 and the mirror frame in place. A plurality of arms 6 radiate from the collar 5. The outer ends of these arms are suitably fastened to plates 7 located at diametrically opposite points. These plates carry mirrors, as for example, the mirror 8 shown in Fig. 1. The plates 7 are in the present instance held rigidly by the arms 6.

Other plates 9 carry mirrors 10. These plates are located in the spaces between the plates 7 thereby providing mirrors on four sides of the lamp 4. However, the plates 9 are pivotally mounted at 11, these pivotal mountings being on adjacent metallic parts of the frames or plates 7.

It is to be observed that the upper edges of the mirror plates or frames come sufficiently far below the lamp 4 to permit the full light to fall on the face F of the user, as in Fig. 3. By following the lines of incidence *a* and reflection *b*, the reader will see that an image of the face F will be visible in the eyes of the user. The positioning of the lamp 4 in back of the mirror instead of front, is offered as a vast improvement over the arrangement of the lamp in front of the mirror in which case the user would not only see the reflection of his face but also a reflection of the lamp itself. This reflection, together with the glare of the lamp, would cause such confusion as to render it difficult to use the shaving stand in comfort. The feature of adjustability of some of the mirrors merely makes for convenience in using the shaving stand and obviates the necessity of bending low in order to see properly.

The illustration in the drawing provides for four mirrors distributed equally about the lamp 4, two of which are fixed and the other two of which are adjustable. In actual practice, the arrangement of mirrors may be otherwise, for example, more than four may be provided, also, more than two may be made adjustable. Those of the mirror plates which are adjustable are movable inside of the plates of the mirrors upon which they are pivotally mounted.

A light stand of this character may also be constructed so that the mirrors are made in the body of the stand forming a more complete device. Such mirrors constructed in the body of the lamp would furnish the necessary reflecting surfaces as truly as do the mirrors in Fig. 1, and at the same time would utilize the convenience of the arrangement of one source of light. Objects surrounding the stand would be illuminated by the lamp, and such illuminated objects would be reflected by the mirrors also as in the case of Fig. 1.

While the construction and arrangement of the improved light stand as herein described and claimed is that of a generally preferred form, obviously modifications and changes may be made without departing from the spirit of the invention or the scope of the claims.

I claim:—

1. A stand having a lamp, a frame having arms extending from the lamp, plates fixed to said arms and carrying mirrors, and other frames pivotally supported by the first frames also carrying mirrors.

2. A device of the character described comprising a standard supporting a lamp, a frame including a collar fitted on the base of the lamp, arms radiating from the collar, and holding means fixed upon said arms; mirrors fixedly carried by said holders, and other plates movably pivoted upon said fixed plates also carrying mirrors.

3. A stand having a lamp, a plurality of mirrors surrounding the lamp to permit use by a number of persons, means by which certain mirrors are fixedly held, and means by which the remaining mirrors are adjustably held.

RUBIN N. CIOLL.